United States Patent [19]

Woodworth

[11] 3,879,637

[45] Apr. 22, 1975

[54] TELEVISION CAMERA

[75] Inventor: William H. Woodworth, China Lake, Calif.

[73] Assignee: The United States of America as represented by the Secretary of the Navy, Washington, D.C.

[22] Filed: Mar. 22, 1972

[21] Appl. No.: 238,710

[52] U.S. Cl. .................. 315/380; 315/403; 178/7.1

[51] Int. Cl. .......................................... H01j 29/70

[58] Field of Search .......... 178/7.1, 7.2, 7.7, 7.5 SE; 315/10, 11, 27, 20, 22, 23

[56] References Cited

UNITED STATES PATENTS

| | | | |
|---|---|---|---|
| 3,284,567 | 11/1966 | Southworth | 178/7.2 |
| 3,355,621 | 11/1967 | Cosgrove | 315/22 |
| 3,389,220 | 6/1968 | Buzan | 178/7.1 |
| 3,399,324 | 8/1968 | Brown | 315/20 |
| 3,470,318 | 9/1969 | Webb | 178/7.1 |
| 3,497,614 | 2/1970 | Petrocelli et al. | 178/7.5 SE |
| 3,535,443 | 10/1970 | Rieke | 178/7.2 |
| 3,600,511 | 8/1971 | Cooksey | 178/7.2 |
| 3,705,328 | 12/1972 | Torok | 315/23 |

*Primary Examiner*—Maynard R. Wilbur
*Assistant Examiner*—J. M. Potenza
*Attorney, Agent, or Firm*—R. S. Sciascia; Roy Miller; Robert W. Adams

[57] ABSTRACT

A TV camera designed to fit in a small volume having a shortened, high-resolution, all magnetic vidicon; integrated circuits; and an electronic zoom. The video amplifier incorporates keyed-clamping, black-clipping, sync-pulse addition, auxiliary outputs for trackers and automatic target control, and an output stage for low-impedance line driving.

5 Claims, 13 Drawing Figures

HORIZONTAL DEFLECTION CIRCUIT

HORIZONTAL DEFLECTION CIRCUIT

VERTICAL DEFLECTION CIRCUIT

OSCILLATOR

SYNCHRONOUS GENERATOR

SWEEP PROTECTION

BLANKING

HIGH-VOLTAGE ELECTRODE SUPPLY

FOCUS REGULATOR CIRCUIT

VERTICAL SYNC AND CLIPPING WAVEFORM

HORIZONTAL SYNC AND CLIPPING WAVEFORM

VIDEO PREAMPLIFIER

VIDEO AMPLIFIER

TELEVISION CAMERA

BACKGROUND OF THE INVENTION

The present invention relates to the field of high-contrast television cameras for use with TV-guided missiles. Since the primary function of a missile system is to deliver a payload, it is advantageous to allow more weight, and provide more volume, for the payload by reducing the volume and weight of the delivery package. That is, given any missile system having a missile cartridge of given dimensions, it is advantageous to increase the volume available for payload by reducing the volume and weight of the delivery package. In the case of a missile system having a television camera, the system's efficiency in terms of payload delivered per missile system pound is increased if the substantial television camera weight and volume is reduced.

The present invention is an improvement over the "Television Camera" of U.S. Patent Application Ser. No. 11,492 now U.S. Pat. No. 3,714,498 by William H. Woodworth, the disclosure of which is incorporated herein. One of the advantages of the present invention over all known prior art, including the application mentioned above, is the miniaturization and weight reduction obtained by the present design.

DESCRIPTION OF THE PREFERRED EMBODIMENT

Figure 1:
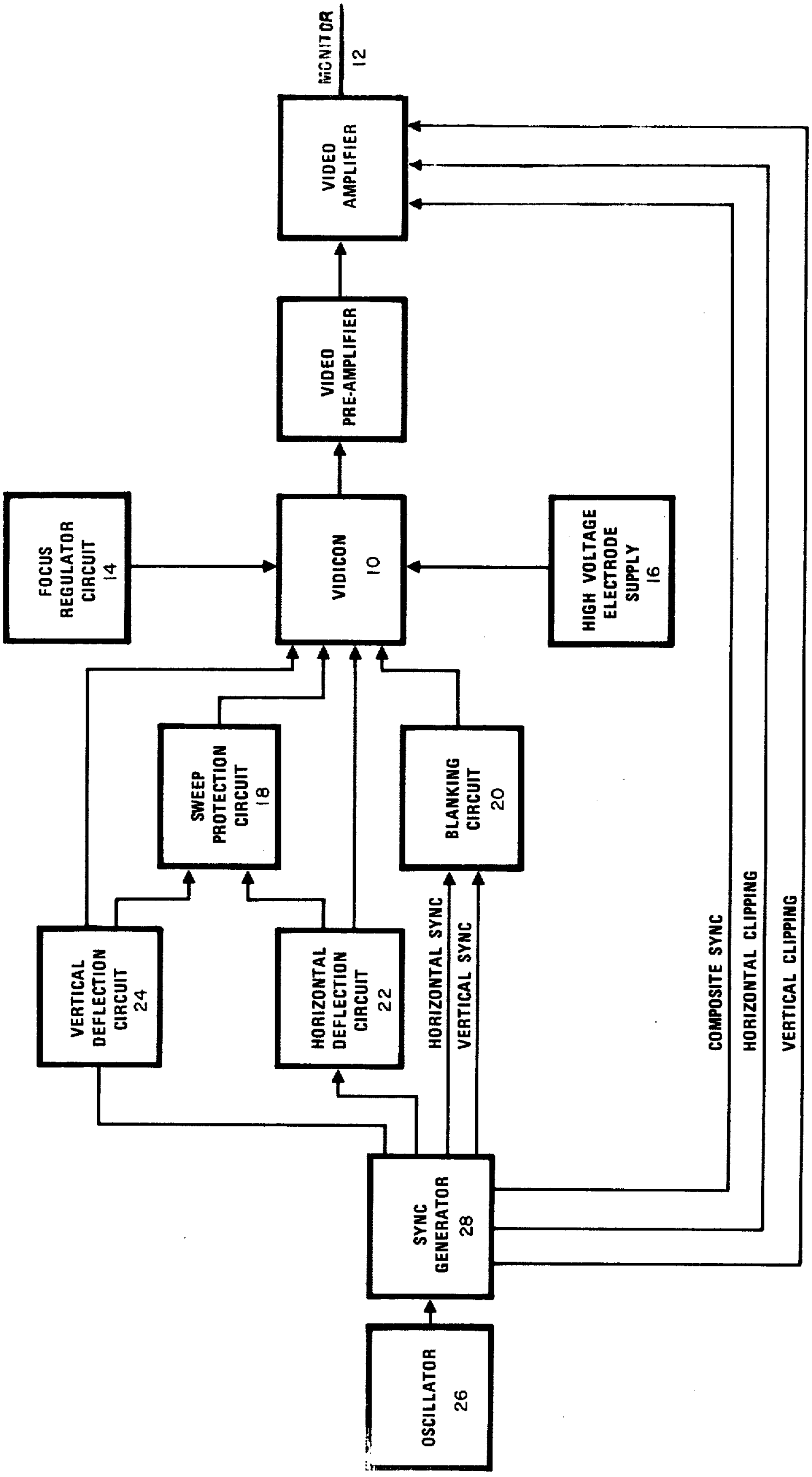
FIG. 1 is a block diagram of the present invention.

The present invention is a television camera specifically designed for use in applications wherein the volume available for the camera is small. The present invention is shown in FIG. 1 and includes a vidicon 10 providing a video output which is preamplified, amplified, and fed to a monitor 12. Also included are a focus regulator circuit 14 which is a precision current source for maintaining camera focus in spite of voltage variations; a high voltage electrode supply 16 which is a regulated voltage source; a sweep protection circuit 18 coupled to the vidicon which provides sweep-failure protection; a blanking circuit 20 coupled to the vidicon for blanking it during retrace; horizontal and vertical deflection circuits 22 and 24 which provide the inputs to the sweep protection circuit and are coupled to the vidicon for controlling the vidicon scan; and an oscillator 26 and sync generator 28 coupled to the horizontal and vertical deflection circuits, blanking circuit, and video amplifier for providing timing and control signals to the camera.

An operative embodiment of the present invention is shown in FIGS. 2 – 13. Component types and values are shown on the drawings for convenience but are provided as an example only of one of numerous embodiments of the present invention.

In the following description it will be assumed that the invention is constructed according to the embodiment shown and described in FIGS. 2 – 13. Although the invention is not limited to the embodiment described, the essential novelty of the present invention will become apparent from the following description.

Vidicon 10 may be an RCA type C23151, all-magnetic unit with the focus and deflection coils permanently bonded to the tube. By this means, the normal alignment and yoke-adjusting procedures are eliminated. The tube has a limiting resolution of approximately 1,200 lines, a response peak of 4,500 to 5,000 angstroms, and an overall length of 4 inches.

Horizontal and vertical deflection circuits 22 and 24 for the vidicon tube were designed for good DC stability and linearity. In addition, they are capable of a 2 to 1 gain change by an external control signal, without any shift of the raster center. The most logical way to accomplish the gain change is to stepwise alter the gain of the deflection amplifiers by changing the value of the series feedback resistors, $R_s$ of FIG. 2 and FIG. 3. The deflection amplifiers have no DC input (capacitive-coupling from the ramp generators) so that the change in gain does not cause a DC level shift in the deflection current. Therefore, the picture expands linearly about the raster center as the deflection current is reduced. In summation, by underscanning the vidicon, electronic zoom is accomplished instantaneously while the center of the picture remains fixed.

Figure 2:
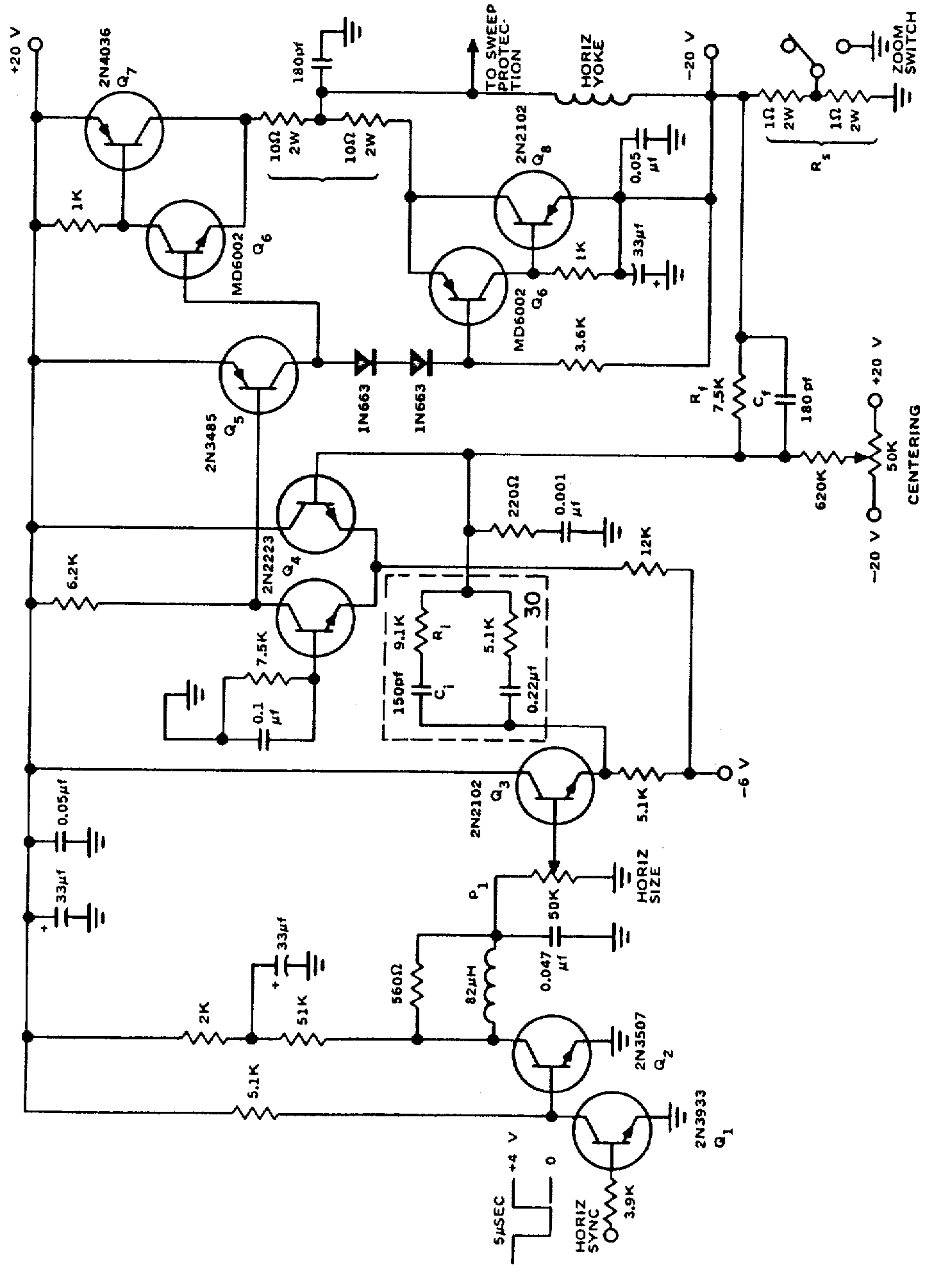
FIG. 2 is a schematic diagram of the horizontal deflection circuit of the preferred embodiment of the present invention.

The horizontal circuit shown in FIG. 2 uses discrete components because of the voltage, power, and slew-rate requirements of some missile systems. Ramp generator 30 is a simple R-C charging circuit with a long time constant. The voltage at $P_1$ is approximately 1 volt, peak-to-peak. Transistors $Q_4$, $Q_5$, $Q_6$, $Q_7$, and $Q_8$ form an operational amplifier with feedback via $R_s$, $R_f$, and $C_f$. Components $C_t$ and $R_t$ correct the yoke-current waveform.

The yoke inductance is approximately 200 microhenries and requires 400 milliamperes, peak-to-peak, for full deflection. The circuit is powered by regulated voltages. Unregulated voltages can be used, but caution should be used to avoid clipping and flyback pulse and thereby adding power supply ripple into the deflection current.

Figure 3:
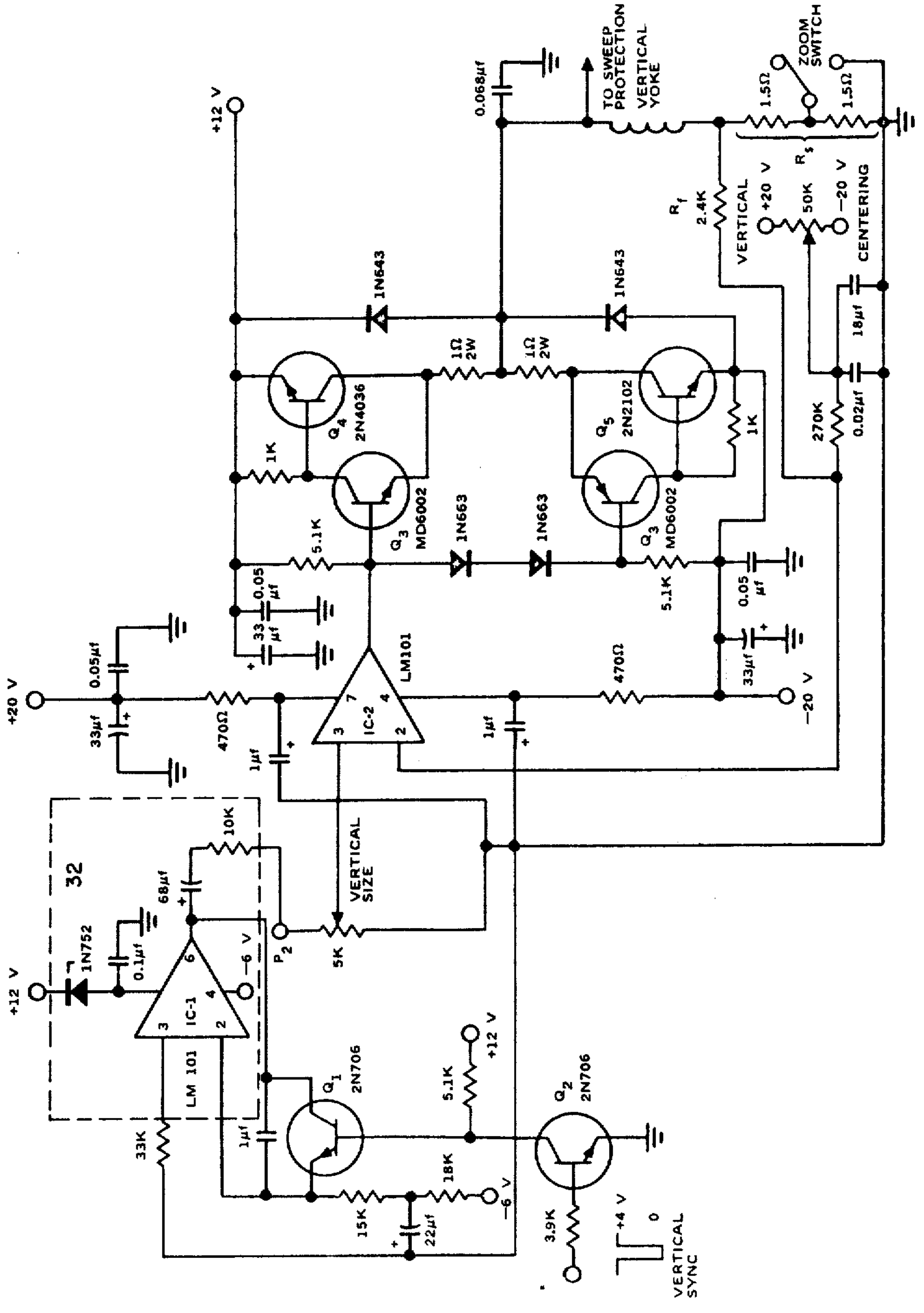
FIG. 3 is a schematic diagram of the vertical deflection circuit of the preferred embodiment of the present invention.

The vertical deflection circuit shown in FIG. 3 is similar in function to the horizontal deflection circuit, but integrated circuit components can be used in certain locations as shown. Ramp generator 32 is an analog integrator (IC–1) with about 1-volt, peak-to-peak, output at $P_2$. The output amplifier is composed of IC–2, $Q_3$, $Q_4$, and $Q_5$; feedback is via $R_s$ and $R_f$. The electronic zoom capabilities are the same as for the horizontal deflection circuit and the yoke characteristics are identical.

Figure 4:
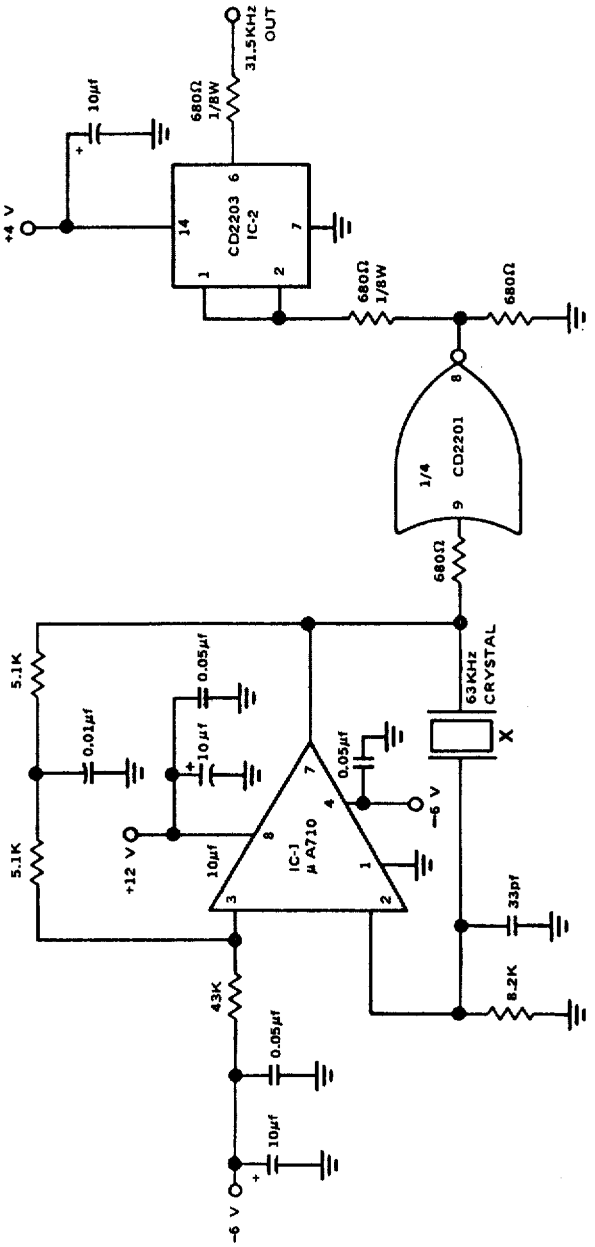
FIG. 4 is a schematic diagram of the preferred embodiment of the oscillator of the present invention.

Syncronizing generator 28 is a crystal-controlled digital counter with multiple outputs for sync and clamping. Oscillator 26 is shown in FIG. 4. IC–1 is an amplifier that has positive feedback via X and provides output at 63 kilohertz. The NAND gate, CD 2201, converts to the logic level and IC–2 counts down to 31.5 kilohertz.

Figure 5:
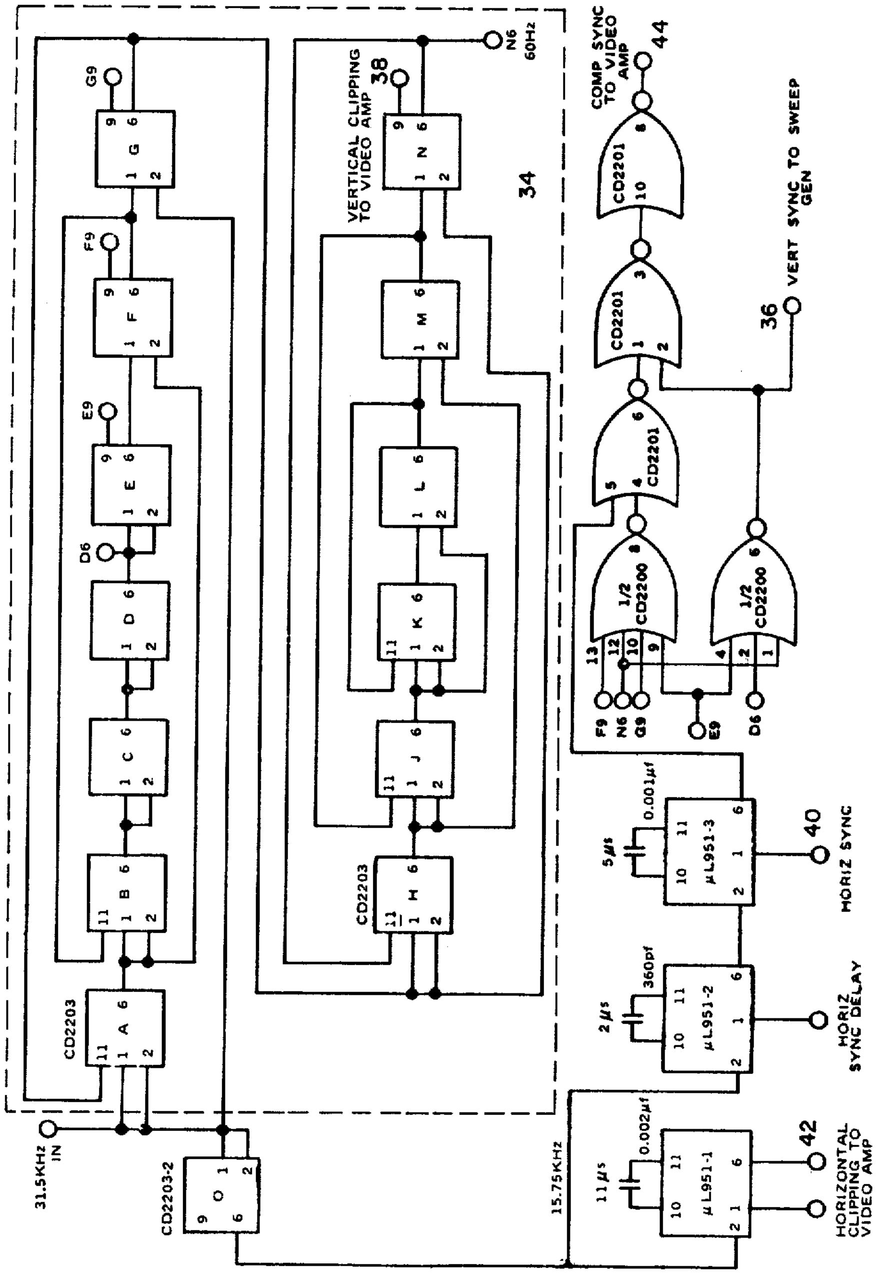
FIG. 5 is a schematic diagram of the preferred embodiment of the synchronous generator of the present invention.
Figure 10:
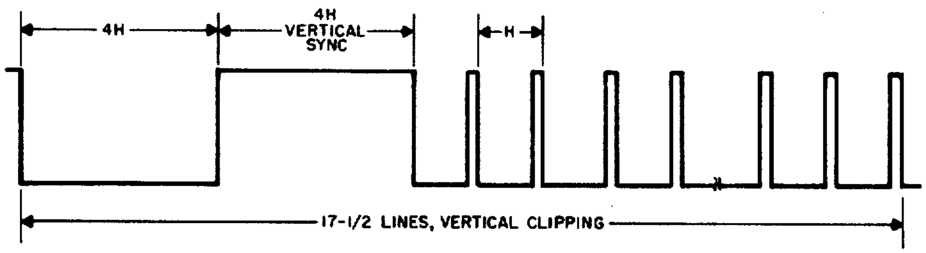
FIG. 10 is a waveform diagram of the vertical sync and clipping waveform of the preferred embodiment of the present invention.

The 31.5-kilohertz signal is fed to the sync generator shown in FIG. 5. The main part is ripple carry counter 34 that divides the input by a factor of 525 to obtain the 60-hertz vertical output. In addition, various outputs are decoded to obtain vertical sync 36 and vertical clipping 38. The horizontal waveforms are not decoded, but generated by one-shot multivibrators, 951-1, -2, and -3. The vertical sync and clipping waveform is shown in FIG. 10.

In the present invention, vertical sync pulse 36 is the retrace drive to vertical deflection circuit 24. Vidicon blanking is obtained from an auxiliary circuit shown in FIG. 7, triggered from the sync pulse and made slightly longer to avoid retrace edge effects. The empty, four-line period (see FIG. 10) at the beginning of clipping is the vertical rest interval. It allows the integrator in vertical sync-separator systems to become discharged and ready to trigger on the vertical sync pulse. Interlace on the display is preserved by this means. The clipping signal normally would be the blanking signal. In this case, it is applied to the video amplifier and causes all video in the interval to be clipped at the black level. In this sense, it is a blanking signal, but it is not applied to the vidicon.

Figure 11:
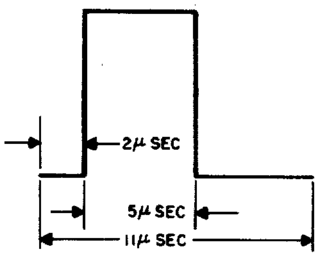
FIG. 11 is a waveform diagram of the horizontal sync and clipping waveform of the preferred embodiment of the present invention.

The horizontal sync (output 40, FIG. 5) and clipping (output 40, FIG. 5) waveform is shown in FIG. 11. The total horizontal clipping interval is 11 microseconds. A front porch of 2 microseconds precedes a 5-microsecond sync pulse. As with the vertical deflection circuit, the sync pulse retraces the horizontal deflection circuit and triggers a slightly longer vidicon blanking pulse. The clipping signal is sent to the video amplifier and clips the video to black during that time.

The remaining components shown in FIG. 5 combine horizontal and vertical synchronizing waveforms to form the composite sync 44, which is used to operate the keyed-clamp, and is also added to the video amplifier output stage to form the composite signal.

Figure 6:
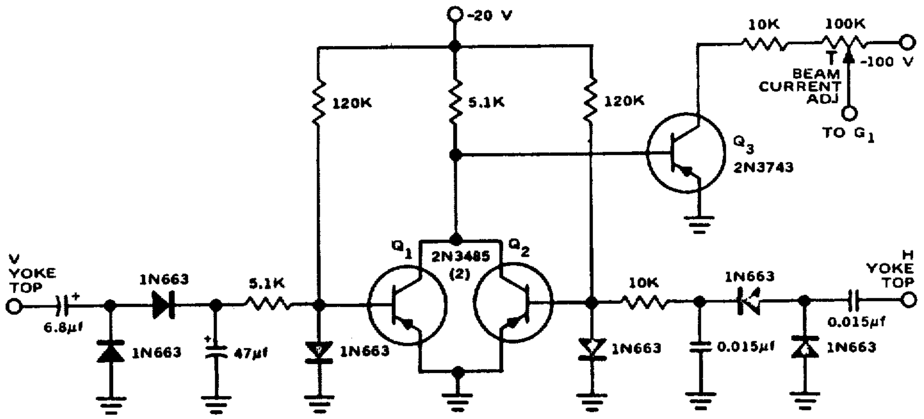
FIG. 6 is a schematic diagram of the preferred embodiment of the sweep-failure protection circuit of the present invention.

The sweep-failure protection circuit shown in FIG. 6 senses the voltage at the top of the yokes, rectifies peak-to-peak, and shuts off $Q_1$ and $Q_2$. A failure of either voltage causes one of these to turn on. Thus, $Q_3$ goes off and the first grid is biased to cut off. The potentiometer, T, sets the operating bias voltage.

Figure 7:
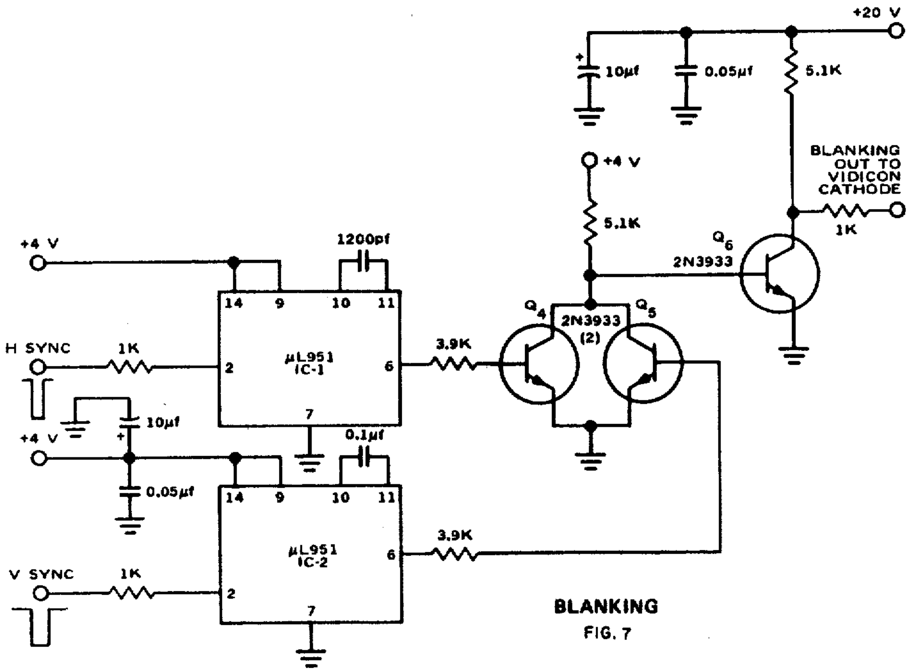
FIG. 7 is a schematic diagram of the preferred embodiment of the blanking circuit of the present invention.

The vidicon blanking is provided by the circuit shown in FIG. 7. Here, IC–1 and IC–2 generate the blanking pulses. Transistors $Q_4$ and $Q_5$ combine them while $Q_6$ amplifies and sends the positive pulses to the vidicon cathode.

Figure 8:
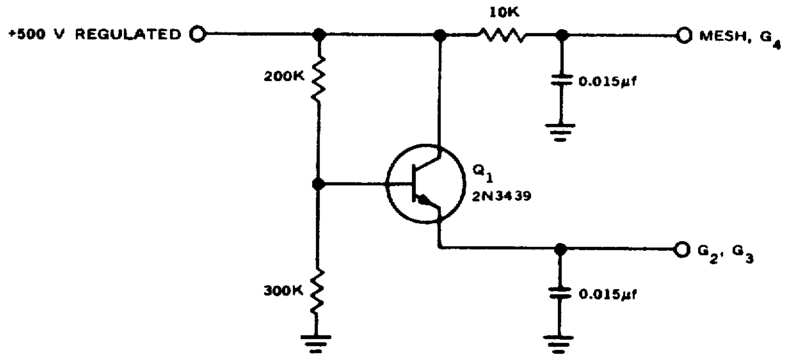
FIG. 8 is a schematic diagram of the preferred embodiment of the high-voltage electrode supply of the present invention.

The vidicon electrode high voltages are supplied by a regulated +500-volt source and an emitter-follower amplifier shown in FIG. 8. The emitter-follower supplies low-impedance voltage to the second grid G2 and the third grid G3 so that blanking and beam current variations do not affect these electrodes. Otherwise, a low-impedance divider must be used with high-power drain.

Figure 9:
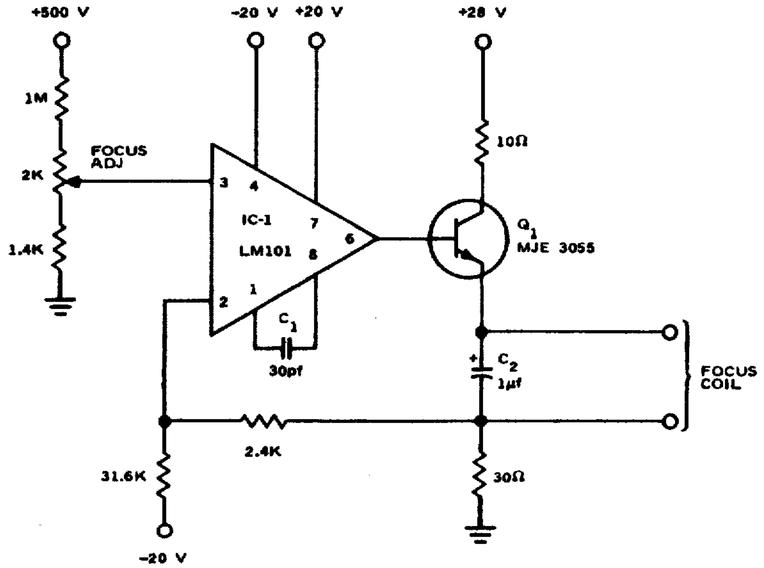
FIG. 9 is a schematic diagram of the preferred embodiment of the focus regulator circuit of the present invention.

The focus current-regulator is a precision current source of approximately 100 milliamperes. It is referenced, in part, to both the high-voltage supply and a fixed supply. FIG. 9 shows the design of the regulator circuit. The required focus current varies as the square-root of the high voltage supply. In the interest of practicality, a linear approximation is made by the circuit, wherein a fixed bias supplies one-half the nominal focus current and the rest is made proportional to the high voltage. A simple approximation like this allows the high voltage to vary ±20% without any degradation in focus. The focus regulator must be highly stable, however, and low-temperature-coefficient, metal-film resistors are used throughout. The video amplifier is one of the most complicated parts of the camera system. In addition to providing wide-band gain, it incorporates keyed-clamping, black-clipping, sync-pulse addition, auxiliary outputs for trackers and automatic target control, and an output stage for low-impedance line driving.

The starting point of the video amplifier chain is the preamplifier. The necessity for low capacitance at the input requires that it be mounted at the vidicon target terminal. Space limitations may require the rest of the video amplifier to be mounted elsewhere, resulting in two sections.

Figure 12:
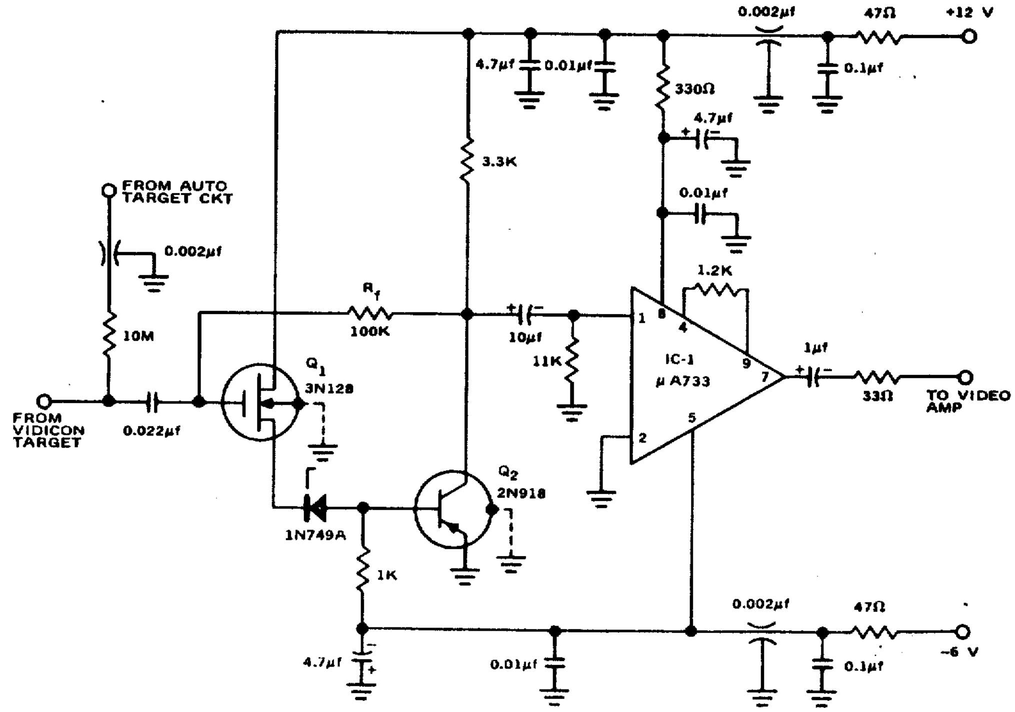
FIG. 12 is a schematic diagram of the preferred embodiment of the video preamplifier of the present invention.

The electrical diagram of the preamplifier is shown in FIG. 12. The MOS transistor $Q_1$ is a 3N128 which has proved to be low in flicker noise and has high RFI rejection. The feedback amplifier, composed of $Q_1$ and $Q_2$, has approximately a 10-megahertz bandwidth. The output amplifier, IC–1, raises the level to 0.15 volt, peak-to-peak, and drives about 200 picofarads of line capacitance to the rest of the video amplifier.

Considerable care should be used in laying out the amplifier since the bandwidth is almost totally a function of parasitic circuit capacitance, particularly that shunting the feedback resistor, $R_f$. The input-shunt capacitance and the 2N918 output-load capacitance, with the feedback network, cause a two-pole response. The damping can be controlled by the shunt capacitance of $R_f$ and its distributed capacitance to ground.

The amplifier should be completely shielded and all power supply leads must enter by feed-through bypass capacitors. The output end should be as remote as possible from the input terminal and the mesh electrode of the vidicon adequately bypassed to the amplifier ground terminal.

Figure 13:
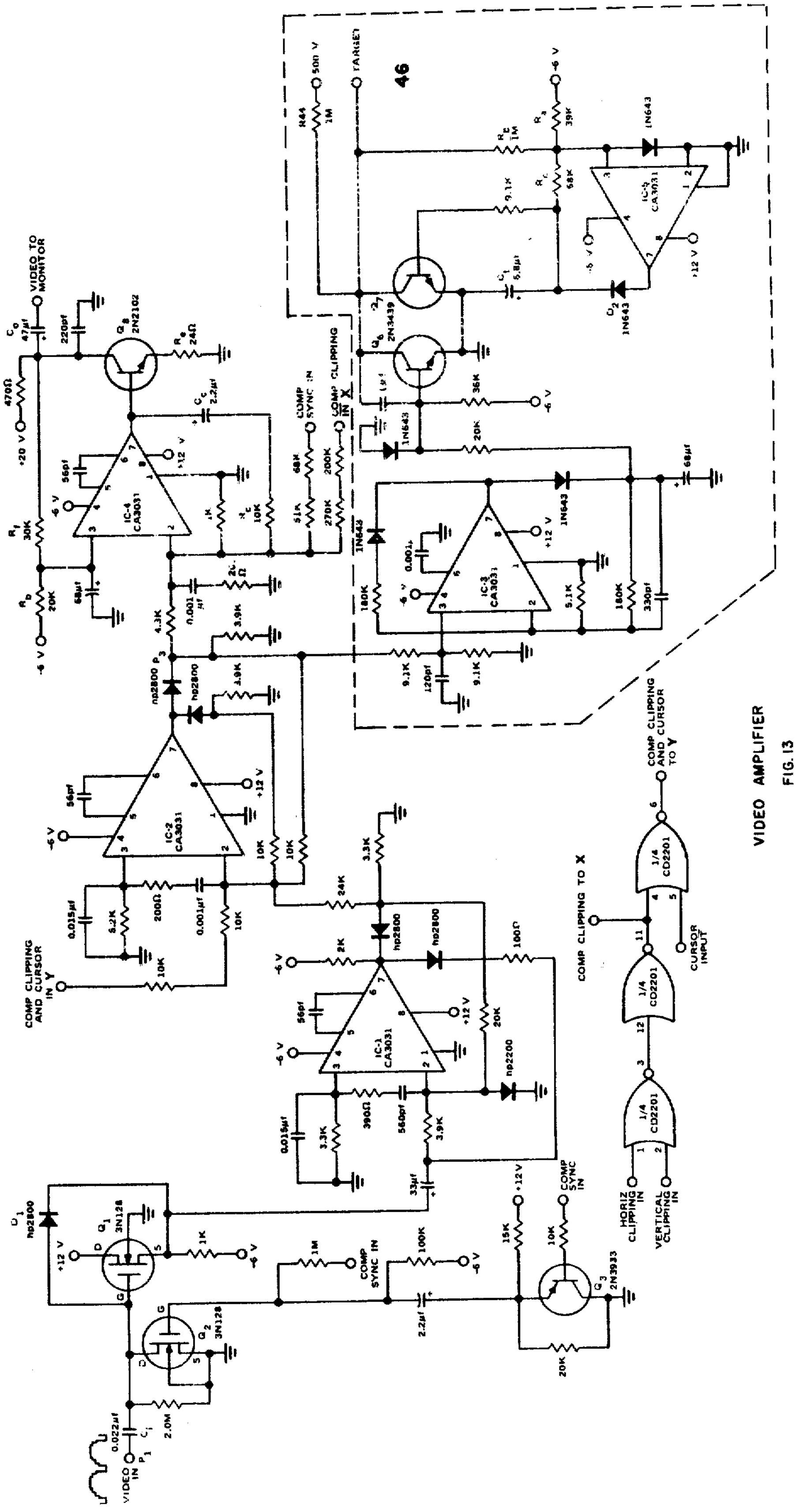
FIG. 13 is a schematic diagram of the preferred embodiment of the video amplifier of the present invention.

The preamplifier output is connected to the video amplifier chain via coaxial cable as shown in FIG. 13. The cable feeds directly into the keyed-clamp circuit, $Q_1$ and $Q_2$. Transistor $Q_2$ is a bidirectional switch, driven by the composite sync from output 44, FIG. 5 and charges $C_i$ to the video black level during horizontal and vertical retrace. Transistor $Q_1$ is a source follower after the clamp. The clamped output is fed to a DC restorer composed of IC–1 and its associated components. The output is white-negative and has an accurately restored black level.

The next stage is the black clipper, composed of IC–2 and associated components. This inverting amplifier is capable of positive output only, so that any negative or blacker-than-black signals are clipped at zero volt. This stage is used to remove the large white signals occurring at the raster edges (an unavoidable effect) and any other signals within the clipping interval. The clipping is accomplished by summing the large, positive clipping signal into the amplifier input, which drives the amplifier toward a negative output. Since the output can only go to zero, any negative output is clipped at zero volt. This assures a zero signal during the interval normally reserved for blanking. Strobe, cursor, or crosshair makers may be added to this stage as black lines. The clipping at zero assures that the markers do not extend into the sync level.

The output stage contains IC–4 and $Q_8$. The main functions of this stage are to add sync pulses and the pedestal level to the video and to drive a 75- or 91-ohm line at a 3-volt, peak-to-peak, level.

Component IC–4 operates as an inverting voltage amplifier driving $Q_8$. The gain of $Q_8$ is the ratio of $(R_{Load}/R_e)$, and is again inverting. The operating point of the output stage is set by the DC feedback loop from the $Q_8$ collector through $R_f$ to the noninverting input of IC–4. A bias input through $R_b$ then sets the $Q_8$ collector voltage. The output impedance of $Q_8$ is approximately the collector load resistance of 470 ohms, hence, the line is driven from a relatively high impedance source. This advantageously reduces the effect of ground-return voltages that might exist between the amplifier output and the display device. These voltages will be attenuated by the ratio (R line/R line + 470 ohms), or, in this case, by a factor of 6. Another advantage of this stage is that it cannot be damaged by a short circuit on the output. Also, if the stage is terminated by two or more display devices in parallel, the output level will reduce proportionately, but will not clip or become nonlinear. It is stable with any type of termination and is an excellent choice for this camera.

Although the automatic target control 46 is not a part of the video amplifier, it may be constructed on the same printed-circuit board and derives its input from the video amplifier. The circuit comprises IC–3, IC–5, $Q_6$, and $Q_7$. A peak detector (IC–3) measures the peak video level. The true peak is smeared out by a bandwidth restriction in IC–3 to prevent small, white objects from causing a large peak voltage. A current proportional to the peak voltage is summed with a reference current at the base of $Q_6$. If the signal current is greater than the reference current, the $Q_6$ collector voltage changes at a rate proporational to the difference. This lowers the vidicon target voltage until the signal and reference currents are equal. Thus, the circuit is a closed-loop feedback regulator.

An anomalous condition can occur in this system. If the vidicon target voltage becomes excessively high, an inversion of video polarity results and the signal level falls to a low value, causing a lock-up of the regulator; that is, the regulator will go to full output in an attempt to raise the video level, which it can no longer do. This situation occurs when the system is first energized and the vidicon filament is heating.

The method used in the present invention to avoid lock-up is to detect when the target voltage has risen to a value that will saturate any tube and then rapidly reset it to zero. The regulator will then slowly raise the target voltage until the video level is correct and hold it at that point. The reset circuit uses IC–5 and $Q_7$. The output of IC–5 is normally low, since it is biased by $R_a$ from the −6 volts to the noninverting input. An input from the target voltage through $R_b$ will, at a precise value, cause the net input to go positive. The output then goes high, charges $C_+$ through $D_1$ and causes lock-up at IC–5 by positive feedback resistor $R_c$. The voltage on $C_+$ causes $Q_7$ to conduct and the target voltage is rapidly reduced to zero. The diode $D_2$ prevents the amplifier from discharging $C_+$ so that $Q_7$ may have time to discharge the target circuit. When the target voltage has dropped, IC–5 output is negative and the target regulator can take over control. With no video present, the recycle rate is about 1 hertz.

The operation in general of the present invention is as follows: vidicon 10 provides a video output which is preamplified by the video amplifier, and coupled to monitor 12 for visual observation. The operation of the vidicon is controlled by the remainder of the circuit. Oscillator 26 and synchronizing generator 28 provide camera synchronization signals to the operational components of the camera, i.e., the horizontal and vertical deflection circuits 22 and 24, the sweep-failure protection circuit 18, and the video amplifier. The horizontal and vertical deflection circuits control the trace of the vidicon and provide outputs to the sweep-failure protection circuit which senses sweep-failure. If sweep fails to occur the protection circuit prevents trace and resultant damage to the camera. Blanking circuit 20 blanks the vidicon between scan traces in the same manner as previous cameras. Focus regulator 14 senses the supply voltage and maintains vidicon focus over a substantial supply voltage range. That is, focus is maintained by the focus regulator circuit even if the supply voltage varies substantially from its design value.

In order to fully utilize the advantages of the present invention, integrated circuit components should be used where they provide an obvious advantage in cost, size, and performance; and the camera circuitry, except the preamplifier, amplifier, and electrode supplies, should be mounted on a single printed-circuit board.

What is claimed is:

1. A television camera, comprising:

means for imposing an image on a surface, scanning the surface with an electronic beam, and providing an output in response to the image on the surface;

means for amplifying the output of said imposing, scanning, and providing means whereby the amplified output can be presented on a television monitor;

means for controlling the trace of the beam of said imposing, scanning, and providing means including means for preventing said beam if the beam fails to scan;

means for preventing said beam during a preselected period of said trace;

means coupled to said amplifying means, said trace controlling means, and said preselected period beam preventing means for synchronizing the operation of said television camera; and means coupled to said imposing, scanning and providing means for selectively reducing the area scanned and rate of scan of said imposing, scanning and providing means to cause a zoom effect with respect to the image imposed on said surface, including a ramp function signal generator and an adjustable gain amplifier providing an output to said imposing, scanning and providing means wherein the adjustable gain amplifier is capacitively coupled to the output of said generator to prevent any D.C. valve from being coupled to said amplifier, and the slope of the ramp function applied to said imposing, scanning and providing means is adjustably controlled by the gain of said adjustable gain amplifier to cause said zoom effect, such that the center of the image scanned before said reduction is in the center of the image scanned during said reduction.

2. The television camera of claim 1 wherein said amplifying means includes:

a preamplifier stage coupled to the output of the imposing, scanning, and providing means;

a clamping circuit coupled to said preamplifier stage and controlled by an output of said synchronizing means;

a clipping circuit coupled to the clamping circuit; and an output stage coupled to the clipping circuit for providing the amplifying means output.

3. The television camera of claim 2 wherein said clipping circuit provides positive value outputs only and includes means for providing a clipping signal which causes the clipping circuit output to become less positive.

4. The television camera of claim 1 wherein said electronic zoom means includes means for altering the voltage gain of the deflection amplifiers of said horizontal and said vertical deflection circuits.

5. The television camera of claim 4 wherein said gain altering means includes a switch and a resistor in each of said horizontal and vertical deflection circuits such that when said switch is closed said resistor is effectively removed from the circuit, resulting in electronic zoom.

* * * * *